(12) United States Patent
Kim (10) Patent No.: US 11,064,857 B2
(45) Date of Patent: Jul. 20, 2021

(54) CLEANER CAPABLE OF CONTROLLING MOTOR POWER AND CONTROL METHOD THEREOF

(71) Applicant: LG ELECTRONICS INC., Seoul (KR)

(72) Inventor: Tae Hyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 13 days.

(21) Appl. No.: 16/559,516

(22) Filed: Sep. 3, 2019

(65) Prior Publication Data

US 2019/0387943 A1 Dec. 26, 2019

(30) Foreign Application Priority Data

Jul. 12, 2019 (KR) .......................... 10-2019-0084428

(51) Int. Cl.
*A47L 9/28* (2006.01)
*A47L 5/22* (2006.01)

(52) U.S. Cl.
CPC .............. *A47L 9/2842* (2013.01); *A47L 5/22* (2013.01); *A47L 9/281* (2013.01)

(58) Field of Classification Search
CPC .......... A47L 9/2842; A47L 5/22; A47L 9/281; A47L 9/2805; A47L 5/24
See application file for complete search history.

(56) References Cited

U.S. PATENT DOCUMENTS

| 10,874,276 | B2 * | 12/2020 | Hird | .......................... A47L 9/02 |
| 2019/0183311 | A1 * | 6/2019 | Diana | ................. A47L 11/4011 |
| 2019/0269289 | A1 * | 9/2019 | Xu | ............................. A47L 5/30 |

FOREIGN PATENT DOCUMENTS

| JP | 2011139773 | 7/2011 |
| KR | 1020050073082 | 7/2005 |
| KR | 1020170030197 | 3/2017 |

OTHER PUBLICATIONS

European Patent Office Application Serial No. 19219813.3, Search Report dated Aug. 14, 2020, 5 pages.

\* cited by examiner

*Primary Examiner* — Dung Van Nguyen
(74) *Attorney, Agent, or Firm* — Lee Hong Degerman Kang & Waimey (57) ABSTRACT

A cleaner capable of controlling motor power and a control method thereof are disclosed. The cleaner may include a head suctioning external dirt, a stick communicating with the head, being adjustable in length, and providing a passage through which dirt that is suctioned moves, a length sensor mounted on the stick and sensing a length change of the stick, a motor providing dirt suction power to the head, a speed measurer measuring a movement speed and a movement direction of the head, and a controller controlling power of the motor. The controller may select minimum power for dirt suction of the motor on the basis of at least one of information about the length change of the stick, the movement speed of the head, and the movement direction of the head, and may control the motor to have the selected minimum power. The cleaner can transmit/receive wireless signals on a mobile communication network established in accordance with 5G (Generation) communication.

13 Claims, 4 Drawing Sheets

CLEANER CAPABLE OF CONTROLLING MOTOR POWER AND CONTROL METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2019-0084428, filed on Jul. 12, 2019, the contents of which are hereby incorporated by reference herein in its entirety.

BACKGROUND

1. Technical Field

Embodiments relate to a cleaner capable of controlling motor power and a control method thereof and, more particularly, a cleaner capable of selecting motor power fitted to each of different use conditions and controlling a motor to have selected power by learning an artificial intelligence model, and a method of controlling the cleaner.

2. Description of Related Art

Description of this section only provides the background information of embodiments without configuring the related art.

When a cleaner is used, a dirt suction amount may be changed in accordance with user's movements. This is because a cleaner has the same dirt suction power when motor power is constant, but the actual dirt suction amount may be changed by different conditions.

For example, when a cleaner is moved fast with constant motor power, the dirt suction amount may decrease, as compared with when moving the cleaner slowly.

Accordingly, in order to increase efficiency of cleaners, it is required to control the cleaners to have appropriate motor power in accordance with use conditions of the cleaners.

On the other hand, recently, a technology about artificial intelligence (AI) is increasingly studied and developed. Artificial intelligence is an area of computer engineering science and information technology that studies methods to make computers mimic intelligent human behaviors such as reasoning, learning, self-improving, and the like.

In order to control cleaners to have appropriate motor power in accordance with use conditions of the cleaners, a technology that uses artificial intelligence model learning may be used.

A technology of sensing a pressure change at a suction port of a cleaner and then controlling the driving speed of a motor on the basis of the sensed pressure change has been disclosed in Korean Patent Application Publication No. 10-2017-0030197.

However, a configuration that controls a cleaner to have appropriate motor power in accordance with use conditions of the cleaner and a configuration that derives motor power for each use condition and controls a cleaner to have such motor power using an artificial intelligence learning model have not been disclosed in the prior art document.

A robot cleaner having a configuration that selects suction power using density of dust that is detected by a piezoelectric sensor has been disclosed in Korean Patent Application Publication No. 10-2005-0073082.

However, similarly, a configuration that controls a cleaner to have appropriate motor power in accordance with use conditions of the cleaner and a configuration that derives motor power for each use condition and controls a cleaner to have such motor power using an artificial intelligence learning model have not been disclosed in the prior art document.

SUMMARY OF THE INVENTION

An object to solve through embodiments is to propose a plan that controls a cleaner to have appropriate motor power in accordance with use conditions of the cleaner.

Another object to solve through embodiments is to propose a plan that derives motor power fitted to use conditions of a cleaner, using artificial intelligence model learning.

Another object to solve through embodiments is to propose a plan that controls a cleaner to have motor power derived through artificial intelligence model learning.

The objects to implement in embodiments are not limited to the technical problems described above and other objects that are not stated herein will be clearly understood by those skilled in the art from the following specifications.

In order to achieve the objects, a cleaner includes a controller and the controller can select minimum power for dirt suction of a motor that is derived in accordance with each use condition of the cleaner and can control the motor to have the selected minimum power.

In this case, the minimum power may be derived through artificial intelligence model learning.

The cleaner may include: a head suctioning external dirt; a stick communicating with the head, being adjustable in length, and providing a passage through which dirt that is suctioned moves; a length sensor mounted on the stick and sensing a length change of the stick; a motor providing dirt suction power to the head; a speed measurer measuring a movement speed and a movement direction of the head; and a controller controlling power of the motor.

The controller may select minimum power for dirt suction of the motor on the basis of at least one of information about the length change of the stick, the movement speed of the head, and the movement direction of the head, and may control the motor to have the selected minimum power.

The controller may receive information about a length change of the stick from the length sensor and may receive information about a change of the movement speed and the movement direction of the head from the speed measurer.

The controller may be connected with a processor that derives the minimum power of the motor.

The processor may receive an input factor based on at least one of information about the length change of the stick, the movement speed of the head, and the movement direction of the head, and may derive the minimum power of the motor.

The input factor may be at least one of the length of the stick, the movement speed of the head, a stay time per unit area of the head, and the number of times of repeatedly moving in a same section of the head.

The stay time per unit area of the head and the number of times of repeatedly moving in a same section of the head may be calculated from information about the movement speed of the head and the movement direction of the head sensed by the speed measurer.

The cleaner may further include a position sensor mounted on the head.

The stay time per unit area of the head and the number of times of repeatedly moving in a same section of the head may be calculated from information about a position change of the head sensed by the position sensor.

The minimum power may be minimum power under each condition learned by sensing a dirt suction amount of the cleaner under conditions that at least one of the length of the stick, the movement speed of the head, the stay time per unit area of the head, and the number of times of repeatedly moving in a same section of the head is different, during a derivation learning mode of the minimum power of the motor of the cleaner.

The processor may derive the minimum power under each condition through learning.

When the length of the stick is a set value or less, the controller may control the motor such that the motor keeps the selected minimum power constant.

The minimum power may be minimum power under each condition learned by sensing a dirt suction amount of the cleaner under conditions with different lengths of the stick during a derivation learning mode of the minimum power of the motor of the cleaner.

The processor may derive the minimum power under each condition through learning.

The processor may be disposed in the controller.

The cleaner may further include a communication unit for communication with a server, in which the processor may be disposed in the server.

The cleaner may further include a memory storing information about the minimum power, in which the controller may select the minimum power on the basis of the information about the minimum power stored in the memory.

The longer the stick or the higher the movement speed of the head, the more the minimum power may increase.

In order to achieve the objects, a method of controlling a cleaner may be separately performed in a learning mode of the cleaner and a use mode of the cleaner.

The method may include, in the learning mode of the cleaner: measuring a dirt suction amount of the cleaner under each of conditions with at least different one of input factors based on at least one of information about a length change of a stick, a movement speed of a head, and a movement direction of the head; deriving minimum power of a motor required under each of the conditions; storing information about the minimum power derived for each of the conditions.

Further, the method may include, in the use mode of the cleaner: finding out each of the conditions; selecting minimum power corresponding to each of the conditions from the stored information about the minimum power; and controlling the motor to have the selected minimum power.

The minimum power of a motor required under each of the conditions may be power of the motor that satisfies a minimum dirt suction amount required for the cleaner.

In an embodiment, there is an effect in that it is possible to achieve convenience for a user and decrease power consumption by appropriately changing the power of the motor in accordance with use conditions of the cleaner.

In an embodiment, by deriving power of the motor corresponding to each use condition of the cleaner through artificial intelligence model learning, it is possible to quickly and appropriately change the power of the motor even if each use condition of the cleaner continuously changes.

In an embodiment, by continuously performing artificial intelligence model learning, even if a use condition of the cleaner rapidly changes, it is possible to quickly derive a power range of the motor fitted to the changed use condition.

DETAILED DESCRIPTION

The accompanying drawings are merely used to help easily understand embodiments of the present disclosure, and it should be understood that the technical idea of the present disclosure is not limited by the accompanying drawings, and these embodiments include all changes, equivalents or alternatives within the idea and the technical scope of the present disclosure.

Furthermore, these terms such as "first," "second," and other numerical terms may be used herein only to describe various elements, but these elements should not be limited by these terms. Furthermore, these terms such as "first," "second," and other numerical terms, are used only to distinguish one element from another element.

In description of embodiments, when an element is described as being "on (over)" or "beneath (under)" another element, it includes both cases that two elements are in direct contact with each other and that another element is disposed between the two elements. Further, the terms "on (over)" or "beneath (under)" not only include the upward direction from one element, but also may include the downward direction.

Further, relational terms to be described below such as "on/over/up" and "beneath/under/down" may be used to discriminate any one subject or element from another subject or element without necessarily requiring or comprehending a physical or logical relationship or sequence of subjects or elements.

Figure 1:
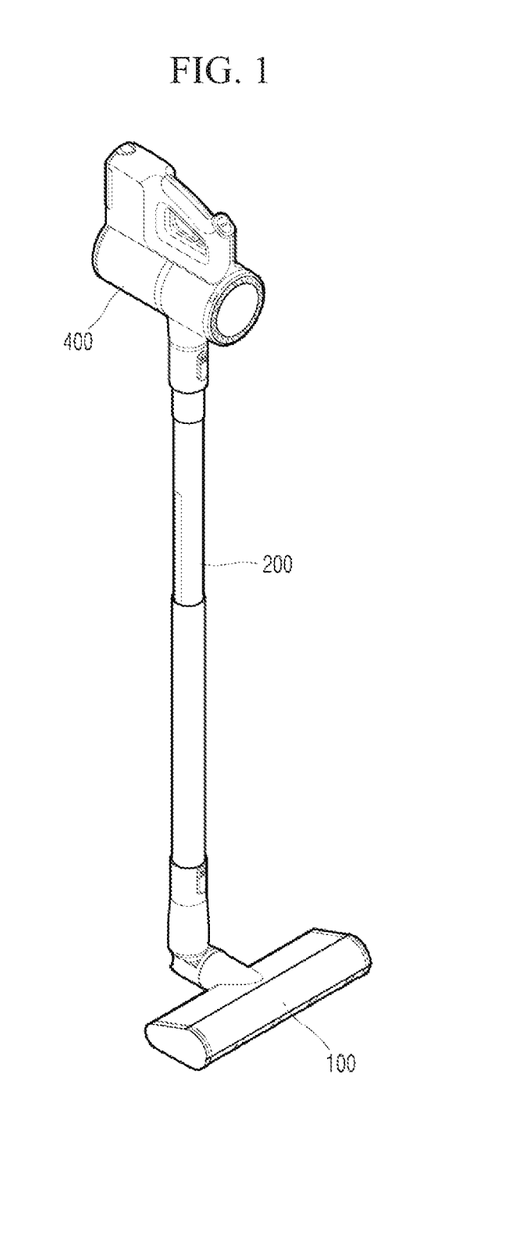
FIG. 1 is a diagram showing a cleaner capable of controlling motor power according to an embodiment.
Figure 2:
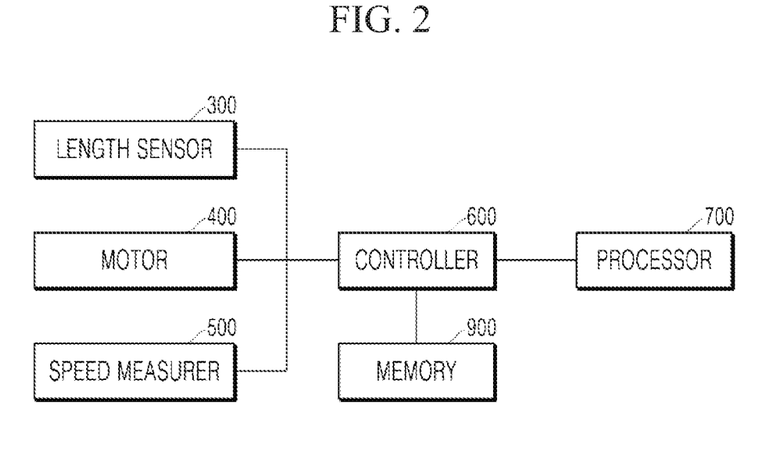
FIG. 2 is a diagram illustrating the structure of a cleaner capable of controlling motor power according to an embodiment.

FIG. 1 is a diagram showing a cleaner capable of controlling motor power according to an embodiment. FIG. 2 is a diagram illustrating the structure of a cleaner capable of controlling motor power according to an embodiment. A cleaner according to an embodiment can control power of a motor 400 and may include a head 100, a stick 200, a length sensor 300, a motor 400, a speed measurer 500, and a controller 600.

The head 100 is a part that suctions external dirt in the cleaner. The head 100 is brought in contact with or moved close to a portion with dirt in a space to be cleaned and then can suction the dirt using suction power that is generated by operation of the motor 400. The head 100 can be operated by a user to suction dirt while moving over portions with the dirt.

The stick 200 may communicate with the head 100 and may provide a passage through which dirt that is suctioned moves. Dirt suctioned in the head 100 can reach a dirt storing device through the stick 200. The stick 200 may be configured to be adjustable in length so that a user can conveniently use the cleaner.

The length sensor 300 is mounted on the stick 200 and can sense a length change of the stick 200. For example, the length sensor 300 may be provided as a plurality of pieces in the longitudinal direction of the stick 200, so it is possible to measure a distance between the plurality of length sensors 300 in accordance with a change in length of the stick 200 and to accurately measure the length change of the stick 200 on the basis of the measured value.

The motor 400 can provide dirt suction power to the head 100. When the motor 400 is operated, dirt suction power is generated at the head 100 and dirt is suctioned into the head 100 and passing through the stick 200, whereby the dirt can be stored in the dirt storing device.

The speed measurer 500 can measure the movement speed and movement direction of the head 100. For example, the speed measurer 500 is mounted on the head 100 and can measure the movement speed and movement direction of the head 100 while moving with the head 100.

The controller 600 is connected with the motor 400 and can control power of the motor 400. In an embodiment, the power of the motor 400 needs to be appropriately controlled. If the power of the motor 400 is insufficient, the dirt suction power reduces, so efficiency of the cleaner may decrease, or the cleaning time may increase.

If the power of the motor 400 is excessive, power may be consumed more than necessary. In particular, when the cleaner is a rechargeable cleaner equipped with a built-in battery, if the power of the motor 400 is excessive, power consumption is increased, so the charge cycle of the battery shortens, which may cause inconvenience to a user.

Accordingly, the motor 400 is required to have appropriate power so that the head 100 can have sufficient dirt suction power and power consumption can be reduced. Hereafter, the appropriate power of the motor 400 is referred to as minimum power.

In an embodiment, the minimum power may be power of the motor 400 that satisfies a minimum dirt suction amount required for the cleaner. That is, the minimum power may be power of the motor 400 that is minimally required to satisfy a minimum dirt suction amount required for the cleaner.

The dirt suction amount, for example, may mean the amount of dirt that the cleaner suctions for time for which the motor 400 operates, that is, the cleaning time. The dirt suction amount may be expressed as a ratio to a unit time with the motor 400 in operation.

The minimum dirt suction amount may be changed in accordance with various factors such as the kind of the cleaner, the capacity of the motor 400, and the size of the cleaner. However, as for cleaners that are the same products, the minimum dirt suction amount is the same. Accordingly, the minimum dirt suction amount is the same and may be a freely set value in cleaners that are the same products.

For the structure of the cleaner, if the power of the motor 400 is constant, the higher the movement speed of the head 100, the less the dirt suction amount may be. Further, if the power of the motor 400 is constant, the dirt suction power of the cleaner increases when the length of the stick 200 is small, so the smaller the length of the stick 200, the more the dirt suction amount can increase.

Accordingly, in an embodiment, it is appropriate to control the motor 400 such that the longer the stick 200 or the higher the movement speed of the head 100, the more the minimum power increases. A minimum power value considering this tendency can be derived by learning an artificial intelligence model to be described below.

Further, if the power of the motor 400 is constant, the dirt suction amount of the cleaner may be changed in accordance with the movement direction of the head 100. This is because when the movement direction of the head 100 is changed, the stay time per unit area of the head 100 and the number of times of repeatedly moving in the same area may be changed.

In this case, when the stay time per unit area of the head 100 increases, the dirt suction amount can be increased, and when the number of times of repeatedly moving in the same area of the head 100 increases, the dirt suction amount for the area can be increased.

In an embodiment, the cleaner can always satisfy the set minimum dirt suction amount even if the length of the head 100, the movement speed of the head 100, or the movement direction of the head 100 is changed. To this end, the controller 600 can control the minimum power of the motor 400. Obviously, the minimum power of the motor 400 of the cleaner can be changed in accordance with the length of the stick 200, the movement speed of the head 100, or the movement direction of the head 100.

In an embodiment, when the length of the stick 200, the movement speed of the head 100, or the movement direction of the head 100 is changed, the cleaner can maintain the set minimum dirt suction amount by adjusting the magnitude of the minimum power.

The controller 600 can select the minimum power for dirt suction of the motor 400 on the basis of at least one of information about a length change of the stick 200, and the movement speed of the head 100 and the movement direction of the head 100, and can control the motor 400 to have the selected minimum power.

The controller 600 can receive information about a length change of the stick 200 from the length sensor 300, can receive information about a change of the movement speed and the movement direction of the head 100 from the speed measurer 500, and can control the motor 400 to have the minimum power on the basis of these items of information.

In this case, the stay time per unit area of the head 100 and the number of times of repeatedly moving in the same section of the head 100 can be calculated, for example, from information about the movement speed of the head 100 and the movement direction of the head 100 sensed by the speed measurer 500.

The stay time per unit area of the head 100 can be calculated, for example, in consideration of time for which the head 100 moves in a direction and time for which the head 100 moves in an opposite direction to the above direction. The number of times of repeatedly moving in the same section of the head 100 can be calculated, for example, in consideration of the number of times of moving of the head 100 in a direction and the number of times of moving of the head 100 in an opposite direction to the above direction.

Figure 3:
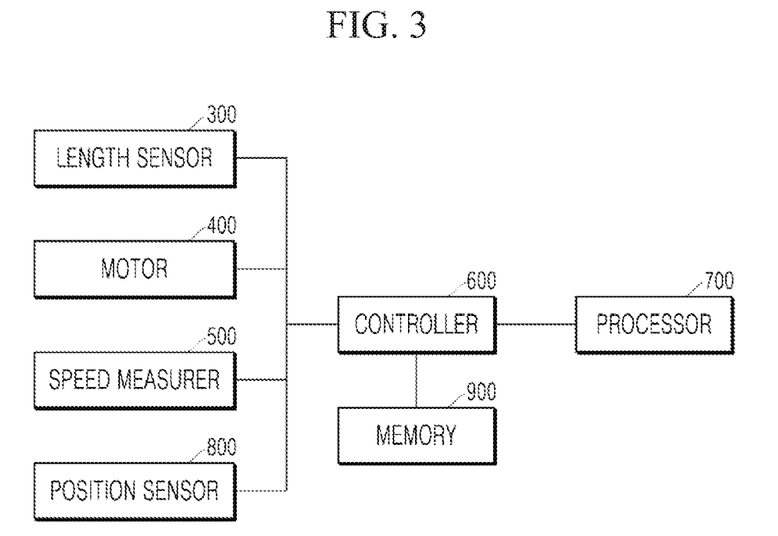
FIG. 3 is a diagram illustrating the structure of a cleaner capable of controlling motor power according to another embodiment.

FIG. 3 is a diagram illustrating the structure of a cleaner capable of controlling motor power according to another embodiment. The cleaner may further include a position sensor 800 mounted on the head 100. The position sensor 800 can sense an accurate movement position of the head 100 by moving with the head 100. The position sensor 800, for example, may be a hall sensor, a GPS sensor, or other various sensors that sense a position change.

The stay time per unit area of the head 100 and the number of times of repeatedly moving in the same section of the head 100 can be calculated from information about a position change of the head 100 sensed by the position sensor 800.

Since it is possible to accurately find out a position change of the head 100 using the position sensor 800, it is possible to more accurately measure the stay time per unit area of the head 100 and the number of times of repeatedly moving in the same section of the head 100.

Referring to FIGS. 2 and 3, the controller 600 may be connected with a processor 700 that derives the minimum power of the motor 400. The processor 700 can derive the minimum power of the motor 400 by learning an artificial intelligence model. The processor has an artificial intelligence neural network, receives input factors, and can derive the minimum power of the motor 400 by learning an artificial intelligence model on the basis of the input factors.

The input factor may be at least one of the length of the stick 200, the movement speed of the head 100, the stay time per unit area of the head 100, and the number of times of repeatedly moving in the same section of the head 100.

The values of the input factors may be finely changed in accordance with time, so it may be appropriate to take average values per unit time as the values of the input factors. Accordingly, in this specification, the input factors may mean average values to unit time.

On the other hand, the cleaner may further include a communication unit for communication with a server and the controller 600 can communicate with the server through the communication unit. The server can store an artificial intelligence model and can also store data required for learning the artificial intelligence model. Further, the server can evaluate the artificial intelligence model and can update the artificial intelligence model for better performance even after evaluation.

The communication unit may be configured to include at least one of a mobile communication module and a wireless internet module. In addition, the communication unit may further include a short-range communication module.

The mobile communication module may transmit and receive wireless signals to and from at least one of a base station, an external terminal, and a server on a mobile communication network established according to technical standards or communication methods for mobile communications, for example, global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), 5 generation (5G) communication and the like.

The wireless internet module refers to a module for wireless internet connection and may be disposed inside or outside the cleaner. The wireless internet module may transmit and receive wireless signals via a communication network according to wireless internet technologies. The cleaner can transmit/receive data to/from a server and various terminals that can perform communication through a 5G network. In particular, the cleaner can perform data communication with a server and a terminal using at least one service of eMBB (enhanced mobile broadband), URLLC (ultra-reliable and low latency communications), and mMTC (massive machine-type communications) through a 5G network.

eMBB (enhanced mobile broadband) is a mobile broadband service, and multimedia contents, wireless data access, etc. are provided through eMBB (enhanced mobile broadband). Further, more improved mobile services such as a hotspot and a wideband coverage for receiving mobile traffic that are tremendously increasing can be provided through eMBB. Large traffic can be received to an area with little mobility and high density of users through a hotspot. A wide and stable wireless environment and user mobility can be secured by a wideband coverage.

A URLLC (ultra-reliable and low latency communications) service defines very severer requirements than existing LTE in terms of reliability in data transmission/reception and transmission delay, and 5G services for production process automation at industrial sites, telemedicine, telesurgery, transportation, safety, etc. are representative.

mMTC (massive machine-type communications) is a service that is not sensitive to transmission delay requiring a relatively small amount of data transmission. A large number of terminals more than common mobile phones such as sensors can simultaneously connect with a wireless access network by mMTC. In this case, the price of the communication module of a terminal should be low and a technology improved to increase power efficiency and save power is required to enable operation for several years without replacing or recharging a battery.

The processor 700 may be disposed in the controller 600 or the server. When the processor 700 is disposed in the controller 600, the cleaner can perform learning an artificial intelligence model for deriving minimum power by itself without specific connection with the server.

The server can transmit information required for the artificial intelligence model to the processor 700 or can make the processor 700 learn the artificial intelligence model when it has the processor 700.

As described above, in an embodiment, since minimum power required for the motor 400 is derived through artificial intelligence model learning, an artificial intelligence model is described hereafter.

Artificial intelligence (AI) is an area of computer engineering science and information technology that studies methods to make computers mimic intelligent human behaviors such as reasoning, learning, self-improving, and the like.

Also, AI does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, that are capable of learning, making predictions, and enhancing its own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons.

Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a previous layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process.

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

Figure 4:
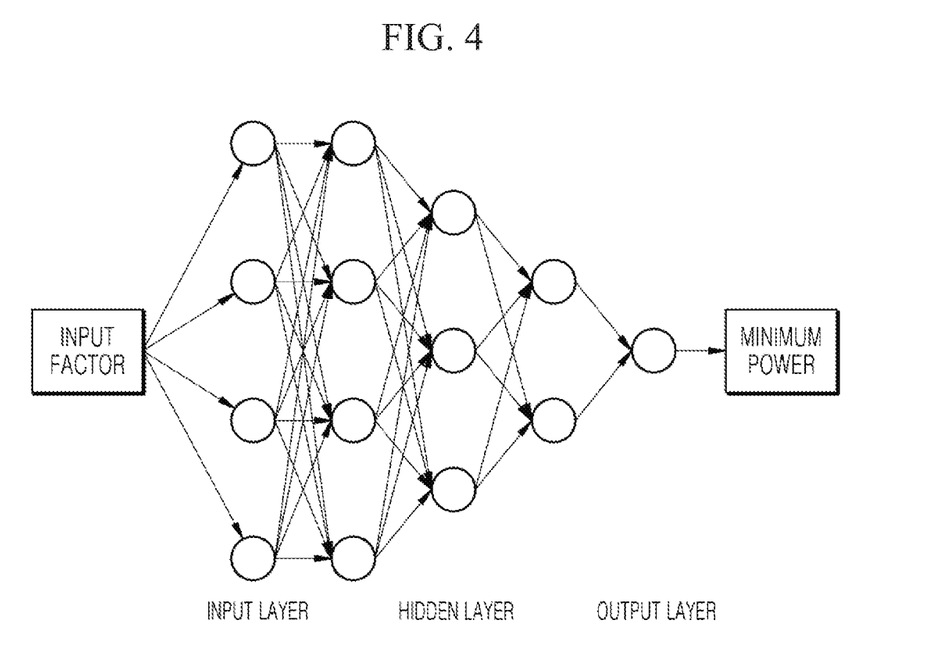
FIG. 4 is a diagram illustrating an artificial intelligence neural network according to an embodiment.

FIG. 4 is a diagram illustrating an artificial intelligence neural network according to an embodiment. An artificial intelligence neural network is disposed in the processor 700 and the processor 700 can learn an artificial intelligence model through the artificial intelligence neural network.

In FIG. 4, minimum power may be minimum power under each condition learned by sensing a dirt suction amount of the cleaner under the conditions that at least one of the length of the stick 200, the movement speed of the head 100, the stay time per unit area of the head 100, and the number of times of repeatedly moving in the same section of the head 100 is different, during a derivation learning mode of the minimum power of the motor 400 of the cleaner. The processor 700 can derive the minimum power under each condition through learning.

Such artificial intelligence model learning may be performed on an artificial intelligence neural network composed of an input layer to which input factors are input, an output layer that outputs minimum power, and a plurality of hidden layers between the input layer and the output layer.

The processor 700 can receive an input factor based on at least one of information about a length change of the stick 200, the movement speed of the head 100, and the movement direction of the head 100 and can derive the minimum power of the motor 400.

As described above, the input factor may be at least one of the length of the stick 200, the movement speed of the head 100, the stay time per unit area of the head 100, and the number of times of repeatedly moving in the same section of the head 100.

When input factors having different conditions are input to an artificial neural network, the processor 700 can derive minimum power of the motor 400 corresponding to the conditions by learning an artificial intelligence model. The minimum power may be power of the motor 400 that satisfies a minimum dirt suction amount required for the cleaner. In this case, the minimum dirt suction amount may be a set value.

Accordingly, the cleaner can derive the power of the motor 400 that satisfies a set minimum dirt suction amount as the minimum power by sensing a dirt suction amount under each condition with different input factors. The cleaner may include a separate dirt sensing device to sense a dirt suction amount. The controller 600 can obtain information about a dirt suction amount from the dirt sensing device.

The cleaner can perform a learning mode for deriving the minimum power of the motor 400. In the learning mode, when input factors having different conditions are input to the artificial neural network of the processor 700, the controller 600 can change the power of the motor 400 and can transmit information about a power change of the motor 400 and a corresponding change in dirt suction amount to the processor 700.

The processor 700 can derive power of the motor 400 that corresponds to the set minimum dirt suction amount as the minimum power under each condition for input factors. The minimum power may have different values under conditions with different input factors.

Accordingly, the minimum power may be one learned by sensing a dirt suction amount of the cleaner under each condition having at least different one of input factors.

When at least one of the input factors, that is, the length of the stick 200, the movement speed of the head 100, the stay time per unit area of the head 100, and the number of times of repeatedly moving in the same section of the head 100 is different, the minimum power can be derived through learning under each condition. The processor 700 can derive the minimum power under each condition through learning.

For example, when an RNN is used as an artificial intelligence learning model, input factors of different conditions are sequentially input to an artificial neural network at different times and the input factors are combined and calculated in the hidden layers, whereby each minimum power corresponding to a set dirt suction amount can be derived under each of conditions with different input factors.

Since the smaller the length of the stick 200, the more the dirt suction power of the head 100 increases, when the length of the stick 200 decreases, the power of the motor 400 can be reduced. However, when the length of the stick 200 is small, the head 100 may not be moved or the movement speed thereof may be very low.

When a user decreases the movement speed of the head 100 and the length of the stick 200 to carefully clean a specific section, it is required to follow the user's intention by making the cleaner have power of the motor 400 over a predetermined level. Accordingly, in this case, it is required to keep the minimum power constant without a decrease with the length of the stick 200 at a set value or less for the convenience of a user.

When the length of the stick 200 is the set value or less, the controller 600 can control the motor 400 so that the motor 400 keeps the selected minimum power constant. Obviously, even in this case, the minimum power may be minimum power under each condition learned by sensing a dirt suction amount of the cleaner under conditions with different lengths of the stick 200 during the derivation learning mode of the minimum power of the motor 400 of the cleaner. Similarly, the processor 700 can derive the minimum power under each condition through learning.

Consequently, when the length of the stick 200 decreases and reaches a set value, minimum power derived through learning at the set value is maintained even if the length of the stick 200 further decreases.

Referring back to FIGS. 2 and 3, the cleaner may further include a memory 900 that stores information about the minimum power. The minimum power is a value learned through the processor 700 under conditions with different input factors. That is, the minimum power that is derived by the processor 700 can be stored in the memory 900.

The controller 600 can select the minimum power on the basis of information about the minimum power stored in the memory 900. Minimum power values under conditions with different input factors are stored in the memory 900. Accordingly, the controller 600 can select minimum power corresponding to input factors the same as the current operation conditions of the cleaner, using the information stored in the memory and can control the motor 400 to have the selected minimum power.

In an embodiment, the processor 700 can learn an artificial intelligence model at any time, and information about input factors and minimum power changed in accordance with a learning result can be updated to the memory 900.

Figure 5:
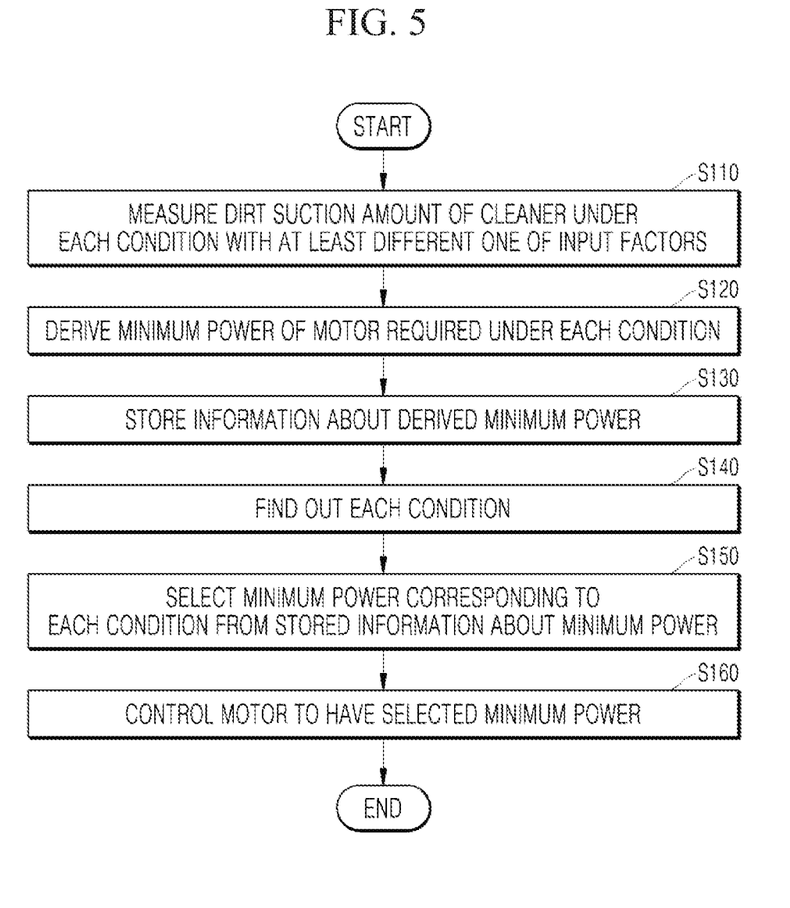
FIG. 5 is a flowchart illustrating a method of controlling a cleaner capable of controlling motor power according to an embodiment.

FIG. 5 is a flowchart illustrating a method of controlling a cleaner capable of controlling power of a motor 400 according to an embodiment. The method of controlling a cleaner may include a learning mode of the cleaner and a use mode of the cleaner.

The following process can be performed in the learning mode of a cleaner. The cleaner can measure a dirt suction amount under each condition with at least different one of input factors based on at least one of information about a length change of the stick 200, the movement speed of the head 100, and the movement direction of the head 100 (S110).

The cleaner may include a separate dirt sensing device to sense a dirt suction amount. The controller 600 can obtain information about a dirt suction amount from the dirt sensing device.

As described above, the input factor may be at least one of the length of the stick 200, the movement speed of the head 100, the stay time per unit area of the head 100, and the number of times of repeatedly moving in the same section of the head 100.

The processor 700 can derive minimum power of the motor 400 that is required under each of the conditions (S120). The minimum power of the motor 400, as described above, may be power of the motor 400 that satisfies a minimum dirt suction amount required for the cleaner.

When input factors having different conditions are input to the artificial neural network of the processor 700, the controller 600 can change the power of the motor 400 and can transmit information about a power change of the motor 400 and a corresponding change in dirt suction amount to the processor 700.

The processor 700 can derive power of the motor 400 that corresponds to a set minimum dirt suction amount as the minimum power under each condition for input factors. The minimum power may have different values under conditions with different input factors. The processor 700 can derive the minimum power under each condition with different input factors through learning. Learning of the processor 700 is the same as the above description.

The memory 900 can store information about the minimum power derived under each condition with different input factors (S130). The information about the minimum power may be each input factor and minimum power corresponding to the input factor.

When the controller 600 has the processor 700, the information about minimum power can be directly stored in the memory 900. When a server has the processor 700, the cleaner can receive the information about minimum power from the server and can store the information in the memory 900.

The learning mode of the cleaner may be performed before the cleaner is delivered from a warehouse, that is, before the cleaner is initially used, and may be performed at any time while the cleaner is actually used. A resultant value obtained by performing the learning mode at any time can be continuously updated to the memory 900.

The following process can be performed in the use mode of a cleaner. The controller 600 can find out each condition with different input factors (S140). When the cleaner is being used, the controller 600 can find out input factors, that is, the length of the stick 200, the movement speed of the head 100, the stay time per unit area of the head 100, and the number of times of repeatedly moving in the same section of the head 100.

The controller 600 can select minimum power corresponding to each condition with different input factors from information about the minimum power stored in the memory 900 (S150). That is, the controller 600 can select minimum power corresponding to the input factor condition of the current use state.

The controller 600 can control the motor 400 to have the selected minimum power (S160). The controller 600 can change the minimum power in accordance with a change of the condition of each input factor.

In an embodiment, there is an effect in that it is possible to achieve convenience for a user and decrease power consumption by appropriately changing the power of the motor 400 in accordance with use conditions of the cleaner.

In an embodiment, by deriving power of the motor 400 corresponding to each use condition of the cleaner through artificial intelligence model learning, it is possible to quickly and appropriately change the power of the motor 400 even if each use condition of the cleaner continuously changes.

In an embodiment, by continuously performing artificial intelligence model learning, even if a use condition of the cleaner rapidly changes, it is possible to quickly derive a power range of the motor 400 fitted to the changed use condition.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As described above in association with embodiments, although some cases were described, other various embodiments are possible. The technical contents of the embodiments described above can be combined in various ways unless they are not compatible, so new embodiments may be correspondingly implemented.

What is claimed is:

1. A cleaner capable of controlling motor power, the cleaner comprising:
   a head suctioning external dirt;
   a stick communicating with the head, being adjustable in length, and providing a passage through which dirt that is suctioned moves;
   a length sensor mounted on the stick and sensing a length change of the stick;
   a motor providing dirt suction power to the head;
   a speed measurer measuring a movement speed and a movement direction of the head; and
   a controller controlling power of the motor,
   wherein the controller selects minimum power for dirt suction of the motor on the basis of at least one of information about the length change of the stick, the movement speed of the head, and the movement direction of the head, and controls the motor to have the selected minimum power.

2. The cleaner of claim 1, wherein the controller receives information about a length change of the stick from the length sensor, and receives information about a change of the movement speed and the movement direction of the head from the speed measurer.

3. The cleaner of claim 1, wherein the controller is connected with a processor that derives the minimum power of the motor, and
   the processor receives an input factor based on at least one of information about the length change of the stick, the movement speed of the head, and the movement direction of the head, and derives the minimum power of the motor.

4. The cleaner of claim 3, wherein the input factor is at least one of the length of the stick, the movement speed of the head, a stay time per unit area of the head, and the number of times of repeatedly moving in a same section of the head.

5. The cleaner of claim 4, wherein the stay time per unit area of the head and the number of times of repeatedly moving in a same section of the head are calculated from information about the movement speed of the head and the movement direction of the head sensed by the speed measurer.

6. The cleaner of claim 4, further comprising a position sensor mounted on the head,
    wherein the stay time per unit area of the head and the number of times of repeatedly moving in a same section of the head are calculated from information about a position change of the head sensed by the position sensor.

7. The cleaner of claim 4, wherein the minimum power is minimum power under each condition learned by sensing a dirt suction amount of the cleaner under conditions that at least one of the length of the stick, the movement speed of the head, the stay time per unit area of the head, and the number of times of repeatedly moving in a same section of the head is different, during a derivation learning mode of the minimum power of the motor of the cleaner, and
    the processor derives the minimum power under each condition through learning.

8. The cleaner of claim 3, wherein when the length of the stick is a set value or less, the controller controls the motor such that the motor keeps the selected minimum power constant.

9. The cleaner of claim 8, wherein the minimum power is minimum power under each condition learned by sensing a dirt suction amount of the cleaner under conditions with different lengths of the stick during a derivation learning mode of the minimum power of the motor of the cleaner, and
    the processor derives the minimum power under each condition through learning.

10. The cleaner of claim 3, wherein the processor is disposed in the controller.

11. The cleaner of claim 3, further comprising a communication unit for communication with a server,
    wherein the processor is disposed in the server.

12. The cleaner of claim 3, further comprising a memory storing information about the minimum power,
    wherein the controller selects the minimum power on the basis of the information about the minimum power stored in the memory.

13. The cleaner of claim 1, wherein the longer the stick or the higher the movement speed of the head, the more the minimum power increases.

* * * * *